(12) United States Patent
Speck et al.

(10) Patent No.: US 11,121,607 B2
(45) Date of Patent: Sep. 14, 2021

(54) ELECTRONICS HOUSING FOR AN E-AXIS DRIVE AND E-AXIS HAVING AN ELECTRONICS HOUSING

(71) Applicant: Schaeffler Technologies AG & Co. KG, Herzogenaurach (DE)

(72) Inventors: Andre Speck, Malsch (DE); Eduard Enderle, Gengenbach (DE); Peter Schwanemann, Bühl (DE); Christian Möhring, Karlsruhe-Rüppurr (DE); Johannes Herrmann, Achern (DE); Ronald Glas, Sasbach (DE); Julian Botiov, Bühl (DE); Cédric Blaes, Munchhausen (FR)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 16/479,305

(22) PCT Filed: Feb. 14, 2018

(86) PCT No.: PCT/DE2018/100127
§ 371 (c)(1),
(2) Date: Jul. 19, 2019

(87) PCT Pub. No.: WO2018/149450
PCT Pub. Date: Aug. 23, 2018

(65) Prior Publication Data
US 2019/0379262 A1 Dec. 12, 2019

(30) Foreign Application Priority Data
Feb. 16, 2017 (DE) .......................... 102017103197.9

(51) Int. Cl.
*H02K 11/33* (2016.01)
*B60K 1/00* (2006.01)
(Continued)

(52) U.S. Cl.
CPC ................ *H02K 11/33* (2016.01); *B60K 1/00* (2013.01); *B60K 11/00* (2013.01); *B60K 23/00* (2013.01);
(Continued)

(58) Field of Classification Search
CPC ................................................. H02K 11/30–38
(Continued)

(56) References Cited

U.S. PATENT DOCUMENTS

2010/0303648 A1* 12/2010 Watanabe ............... H02K 11/33
417/411
2017/0346361 A1* 11/2017 Albl ........................ H02K 5/225
(Continued)

FOREIGN PATENT DOCUMENTS

| CN | 102594028 A | 7/2012 |
| CN | 103179658 A | 6/2013 |

(Continued)

OTHER PUBLICATIONS

Machine translation of DE 10 2011 089 667 A1 retrived from ESPACENET on Aug. 27, 2020.*

*Primary Examiner* — Quyen P Leung
*Assistant Examiner* — Minki Chang
(74) *Attorney, Agent, or Firm* — LeKeisha M. Suggs

(57) ABSTRACT

An electronic system housing for an E-axle drive of a motor vehicle is disclosed. The electronic system housing comprises a power electronic system received within the electronic system housing for processing voltage in high voltage systems. At least one low voltage component is further received within the electronic system housing.

8 Claims, 2 Drawing Sheets

(51) Int. Cl.

| | | |
|---|---|---|
| *B60K 11/00* | (2006.01) | |
| *B60K 23/00* | (2006.01) | |
| *B60K 26/00* | (2006.01) | |
| *H02K 5/20* | (2006.01) | |
| *H02K 5/22* | (2006.01) | |
| *H02K 7/00* | (2006.01) | |
| *H02K 11/01* | (2016.01) | |

(52) U.S. Cl.
CPC ............... *B60K 26/00* (2013.01); *H02K 5/20* (2013.01); *H02K 5/225* (2013.01); *H02K 7/006* (2013.01); *H02K 11/0141* (2020.08); *B60Y 2200/92* (2013.01); *B60Y 2400/60* (2013.01); *B60Y 2400/61* (2013.01)

(58) Field of Classification Search
USPC ..................... 310/66, 68 R–68 E, 75 R–75 D
See application file for complete search history.

(56) References Cited

U.S. PATENT DOCUMENTS

2017/0364361 A1* 12/2017 Yang .................... G06F 9/30145
2018/0093698 A1*  4/2018 Urimoto ................ H02K 11/21

FOREIGN PATENT DOCUMENTS

| DE | 102010041589 A1 | 3/2012 |
|---|---|---|
| DE | 102011089667 A | 6/2013 |
| DE | 102014019433 A1 | 6/2016 |
| EP | 2475079 A2 | 7/2012 |

\* cited by examiner

ELECTRONICS HOUSING FOR AN E-AXIS DRIVE AND E-AXIS HAVING AN ELECTRONICS HOUSING

CROSS-REFERENCE TO RELATED APPLICATIONS

This application is the U.S. National Phase of PCT Appln. No. PCT/DE2018/100127 filed Feb. 14, 2018, which claims priority to DE 102017103197.9 filed Feb. 16, 2017, the entire disclosures of which are incorporated by reference herein.

TECHNICAL FIELD

The present disclosure relates to an electronic system housing for an E-axle drive of a motor vehicle, in particular a hybrid vehicle having a P4 hybrid arrangement, wherein the electronic system housing is prepared to receive a power electronic system for processing voltage in high voltage systems or 48 Volt voltage systems/48 Volt direct current systems. Furthermore, the present disclosure relates to an E-axle having such an electronic system housing.

BACKGROUND

E-axle drives having associated housings are known from the prior art. DE 10 2010 041 589 A1 inter alia discloses a housing element for receiving a power electronic system of an electric machine, comprising a first housing region that is configured for receiving a power electronic system, wherein the first housing region comprises a cooling region that is configured so as to be coupled to a cooling region of an electric machine for the common cooling arrangement of the power electronic system and electric machine, wherein the first housing region comprises a sealing element that is configured so as to be coupled in a sealed manner to at least one further housing element of an electric machine.

However, the prior art always has the disadvantage that only components and interfaces in the high voltage range are integrated in the housing for the power electronic system, however low voltage components and low voltage interfaces are housed in a separate housing. Further cables and plugs are therefore required for the connection as a result of this second separate housing for the low voltage electronic system, which is reflected in increased costs and an enlarged installation space that is required.

SUMMARY

The object of the present disclosure is to avoid or at least to mitigate the disadvantages of the prior art by virtue of the fact that an electronic system housing is designed in such a manner that the housing parts are more compact and the space that is required is reduced.

In particular, it is to be achieved that plugs and cables do not require relocation in the vehicle.

This object is achieved in the case of a device of the generic type in accordance with the present disclosure by virtue of the fact that such an electronic system housing is used, which is prepared, in particular materially and/or geometrically, in order to receive at least one low voltage component.

This has the advantage that considerable installation space may be saved by means of integrating all the electronic system components in one housing and additional components, such as for example cables or plugs are no longer required, which advantageously reduces the costs and also limits power losses to a minimum as a result of by way of example line resistances in the cables.

Advantageous embodiments are claimed in the claims and are explained below in further detail.

It is also advantageous if the low voltage component is a motor sensor system or E-machine sensor system, a temperature sensor, a cooling arrangement and/or actuator sensor system, such as for example a parking brake actuator system or transmission actuator system. As a consequence, the low voltage components may be advantageously arranged on a small installation space and may be connected to the associated actuators via a common interface or multiple interfaces. Furthermore, a complete, tested and operationally capable system may thus be provided, which may be used without relocating cables in the vehicle. Consequently, the susceptibility to failure of the electronic system components also reduces since in particular the plug connections, cables and other interfaces represent frequent causes of failure.

Moreover, it is expedient if the electronic system housing comprises low voltage interfaces for actuators. The associated actuators may thus be connected for the sensors in a suitable manner so that the control by means of the sensor actuator circuit functions properly.

A cost-effective exemplary embodiment is also characterized by virtue of the fact that the electronic system housing is connected to an overall housing, wherein the overall housing is designed in order to receive the E-axle drive. The, in particular very expensive, meter-long high voltage cables between the E-axle and the electronic system are thus not required, which leads to the housing being considerably more compact and the required installation space being reduced. The high costs of the high voltage cabling and the plug may therefore be advantageously avoided.

It is also advantageous if the E-axle drive includes an electric machine or an E-machine or an electric motor, a transmission and/or a differential. The power of the battery may thus be passed on via the power electronic system in particular to the electric machine.

Moreover, it is advantageous if the electronic system housing is embodied as a single part/materially homogeneous with the overall housing or if the electronic system housing and the overall housing comprise interfaces that are coordinated with one another. In the case of the single-part design, it is therefore possible advantageously to omit the separate electronic system housing, which means additionally saving the interfaces between the housings. A further advantage of the single-part embodiment of the two housings is that additional sealing interfaces, for example to the housing of the electronic system on the cooling connectors and on the phase connectors of the E-machine may be omitted. In the case of the two-part design of the electronic system housing of the overall housing, it is in particular advantageous that the two housings are particularly variable and therefore an associated ability to build the housing from a kit for various different applications and projects may be ensured.

It is expedient if the interfaces are provided geometrically in order to be pressed together in a positive-locking manner. An advantage with regard to the sealing arrangement and use of a common cooling source is thus ensured merely by means of coordinating the two housings.

Moreover, the interfaces may be connected via screws, rivets and/or pins. The two housings may thus be assembled on one another in a simple manner but also when required, for example in the event of maintenance or a disassembly procedure, may be detached from one another in a simple manner.

Moreover, it is advantageous if the electronic system housing is arranged below (when viewed in terms of gravity) the overall housing, which ensures easy access to the electronic system components since the E-axle drive is usually installed on the rear axle and consequently access is facilitated from below. It is preferred that the electronic system housing is therefore located in the installed state on the underside of the overall housing.

Moreover, it is expedient if at least one cooling connector is provided on the electronic system housing. It is thus ensured that the components that are housed therein do not overheat but rather that a sufficient cooling arrangement and functionality may be ensured. Coolant is therefore supplied by means of the cooling connector, said coolant having a heat-absorbing effect in the electronic system housing and having a heat-dissipating effect when leaving the electronic system housing.

It is further preferred that the cooling connector is arranged on the side of the electronic system housing, which represents an improved connecting possibility for the coolant flow and consequently only negligibly influences the surrounding components.

It is also advantageous if the cooling connector is connected to a cooling circuit of the E-machine or the motor vehicle, therefore the cooling circuit that is already present for the components that are housed in the overall housing may also be used for the electronic system housing and it is not necessary to configure a dedicated cooling circuit, which is also associated with saving components and accordingly costs.

An intermediate element may also be arranged between the electronic system housing and the overall housing or between different components within the electronic system housing, said intermediate element in particular being embodied according to a type of a metal plate/sheet metal part. As a consequence, in particular the control module/the motor sensor system is more effectively shielded by way of example by the E-machine with the result that the electromagnetic compatibility is improved.

It is preferred that the electronic system housing is embodied from aluminum or comprises aluminum. Since aluminum comprises good characteristics with regard to electromagnetic compatibility, this material is even recommended for the electronic system housing so that the electrical components are not negatively influenced despite being constructed in proximity to the E-machine.

Moreover, it is advantageous if a connector for a 28 pin signal plug is provided on the electronic system housing. This connector conforms to the standards for electronic system components and is consequently particularly suitable as a connector for the allocated actuators.

It is also advantageous if the connector for the signal plug to the electronic system housing is sealed, which rules out particles or fluids being able to penetrate into the electronic system housing via the connector.

A connector for a current supply may also be provided on the electronic system housing. This current supply may be used after the processing procedure by means of the power electronic system in order to supply the components that are arranged in the overall housing, in particular the E-machine. In particular, the current supply may be realized via a type of "battery line".

The object is also achieved in accordance with the present disclosure by virtue of the fact that an E-axle having such an electronic system housing is used, wherein the power electronic system is inserted into the electronic system housing for the high voltage processing procedure and the low voltage component is inserted into the electronic system housing.

A part of the solution in accordance with the present disclosure is also to use an E-axle with the electronic system housing and with an overall housing in which a rotor and a stator of an E-machine are housed.

In other words, the present disclosure may be used in electric axle applications. A transmission, which is possibly embodied in a multi-stage manner, and also where applicable a parking brake or differential lock, an E-machine and a power electronic system are associated with the E-axle. Often, power electronic systems that are housed separately are placed independently of the E-axle in the vehicle with the result that the connection between the power electronic system and the E-axle must be realized by means of high voltage cables. As a consequence, high costs are incurred for the high voltage cabling and the plugs but also an increased installation space is required for placing the power electronic system. In particular, if additional actuators are provided on the E-axle, conventionally an additional separate electronic system is required for these actuators, which in turn increases the costs for the cable, plugs and housing. The present disclosure therefore provides that the power electronic system is integrated into the E-axle housing/overall housing that is provided.

In this case, the low voltage interfaces for a motor sensor system are to be integrated into the power electronic system. Where applicable, actuator electronic systems that are provided are also to be integrated into the power electronic system. In order to ensure access to the power electronic system and the other electronic system components, it is advantageous if the power electronic system housing is integrated close to the E-machine below the E-axle in the housing in a manner that saves installation space. It is conceivable either to embody the two housings as a single part/as materially homogeneous or to assemble the power electronic system in the housing cover and subsequently to fasten on the housing of the E-axle as an interface between the housing of the power electronic system and the housing of the E-axle. The two arrangements may thus be pre-assembled in the dedicated separate housing and then joined together in a simple manner. This ensures a high degree of variability of the housing formations and an ability to build the housing from a kit for various different applications and projects.

If the E-axle and the power electronic system are assembled in a common housing, the power electronic system is arranged in the lower region of the housing. It is therefore possible to omit a separate electronic system housing. The common housing is closed with a cover below the electronic system components, therefore the electronic system components are accessible for maintenance or a disassembly procedure. A complete system may thus be provided that includes a tested and operationally capable system. Moreover, it is thus possible to omit expensive high voltage connectors between the E-axle and the power electronic system. In particular, the present disclosure is used in hybrid modules. It is preferred that such an integrated power electronic system is used in a P4 hybrid arrangement, however it is also possible to use the integrated power electronic system in a P2 hybrid arrangement.

BRIEF DESCRIPTION OF THE DRAWINGS

The present disclosure is explained below with the aid of drawings. In the drawings.

The figures are merely schematic in nature and are solely used to facilitate the understanding of the present disclosure. Identical elements are provided with the same reference numerals. The features of the individual exemplary embodiments are interchangeable.

DETAILED DESCRIPTION

Figure 1:
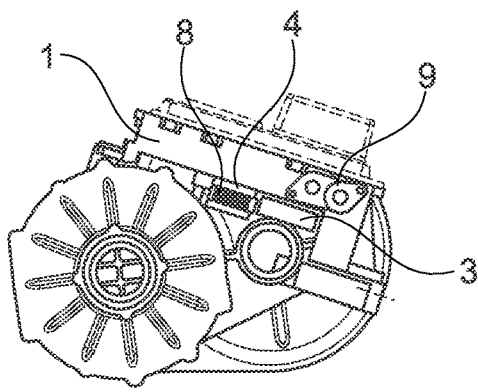
FIG. 1 illustrates a cross sectional view of an electronic system housing that is connected to an overall housing for an E-axle drive in a first exemplary embodiment.
Figure 2:
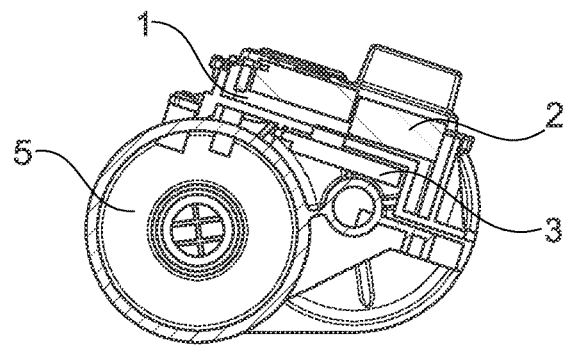
FIG. 2 illustrates a cross sectional view of the electronic system housing and the overall housing, said cross sectional view being axially offset with respect to FIG. 1.
Figure 3:
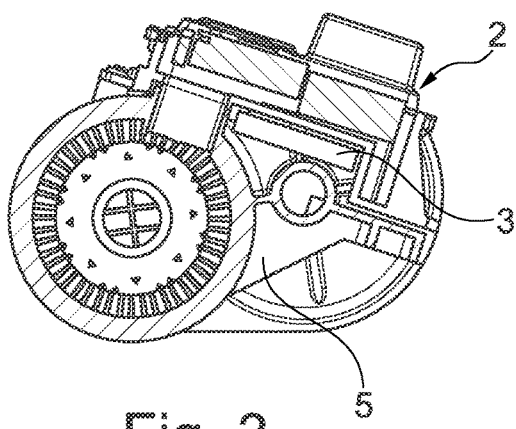
FIG. 3 illustrates a cross sectional view of the electronic system housing and the overall housing, said cross sectional view being axially offset with respect to FIG. 1 and FIG. 2.

The FIGS. 1 to 3 illustrate cross sectional views of various axial positions of an electronic system housing 1 in which a power electronic system 2 and at least one low voltage component 3 having a low voltage interface 4 for associated actuators are arranged, wherein the electronic system housing 1 is connected to an overall housing 5 in which the E-axle drive is received. Therefore not only the power electronic system 2 is arranged in the electronic system housing 1 but also the low voltage components 3 such as for example a motor sensor system, temperature sensors, a parking brake actuator system or a transmission actuator system are housed in the electronic system housing 1.

Figure 4:
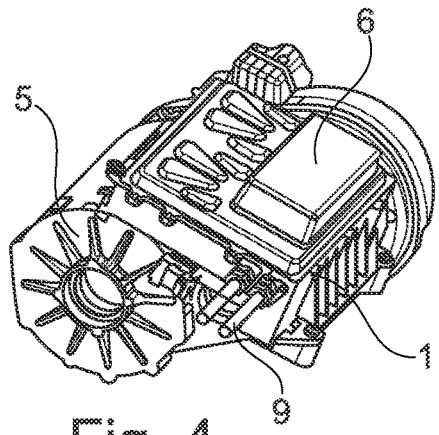
FIG. 4 illustrates a perspective view of the electronic system housing that is assembled on the overall housing.

As is apparent in FIG. 4, the electronic system housing 1 is arranged immediately adjacent to the overall housing 5 and is connected to said overall housing. The electronic system housing 1 is closed with a cover 6. In this case, the cover 6 is tailored to the contour of the components that are arranged in the electronic system housing. The cover 6 is thus fastened on the electronic system housing 1 in such a manner that said cover may be removed in a simple manner in the event of maintenance or for the disassembly procedure.

Figure 5:
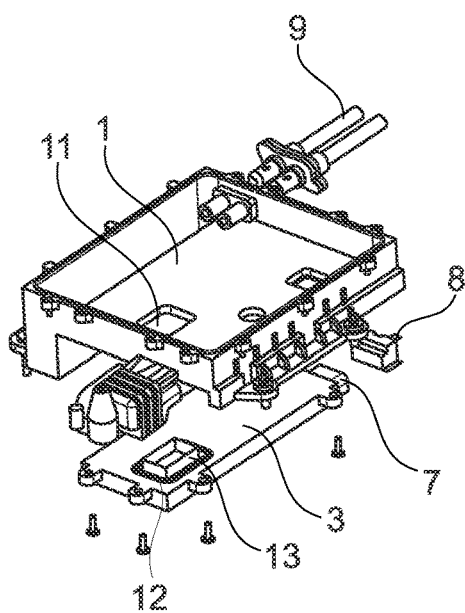
FIG. 5 illustrates an exploded view of the overall housing and the electronic system housing.

The electronic system housing 1 is embodied in such a manner that an intermediate plate is arranged between the control components and the E-axle with the result that the respective components scarcely influence one another in an electromagnetic manner. A connector 7 is provided on the low voltage component 3 and the electronic system housing 1 and a 28 pin signal plug 8 may be placed on said connector in a sealing manner. Further actuators may be connected to this signal plug 8. A current connector is also provided on the electronic system housing 1, said current connector being embodied (cf. FIG. 5) as a "battery line" 9.

Figure 6:
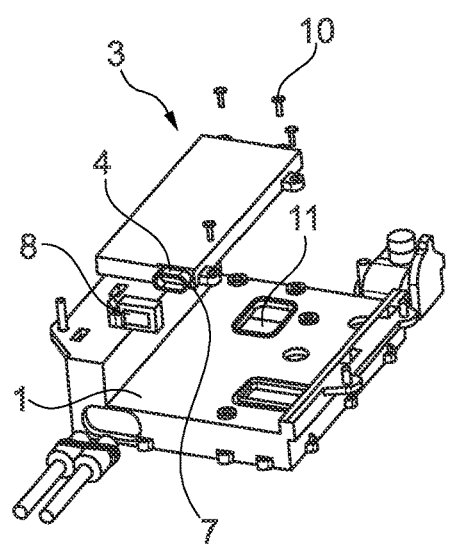
FIG. 6 illustrates an exploded view, rotated with respect to FIG. 5, of the overall housing and the electronic system housing.
Figures 7, 8:
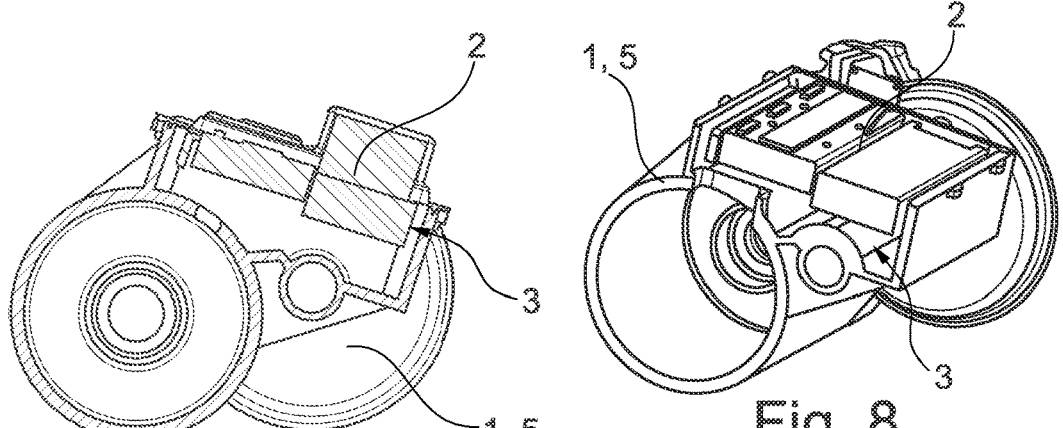
FIG. 7 illustrates a cross sectional view of the electronic system housing and the overall housing having a common housing in a second exemplary embodiment.
FIG. 8 illustrates a perspective view with a cross section through the electronic system housing and the overall housing.
Figures 9, 10:
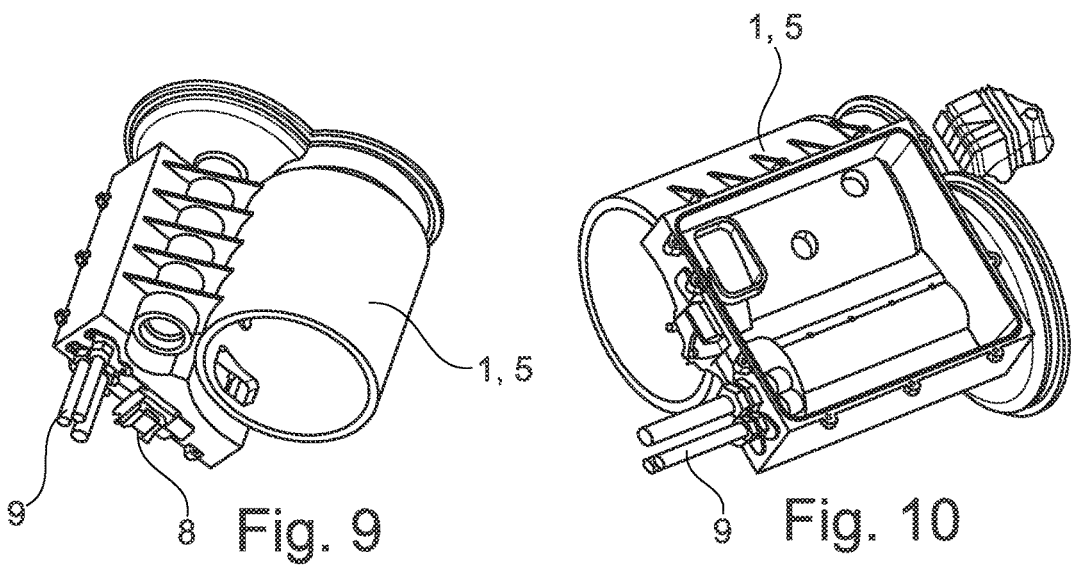
FIG. 9 illustrates a perspective view of the overall housing.
FIG. 10 illustrates a perspective view of the overall housing and the electronic system housing in the disassembled state of the electronic system components and the control components.
Figures 11, 12:
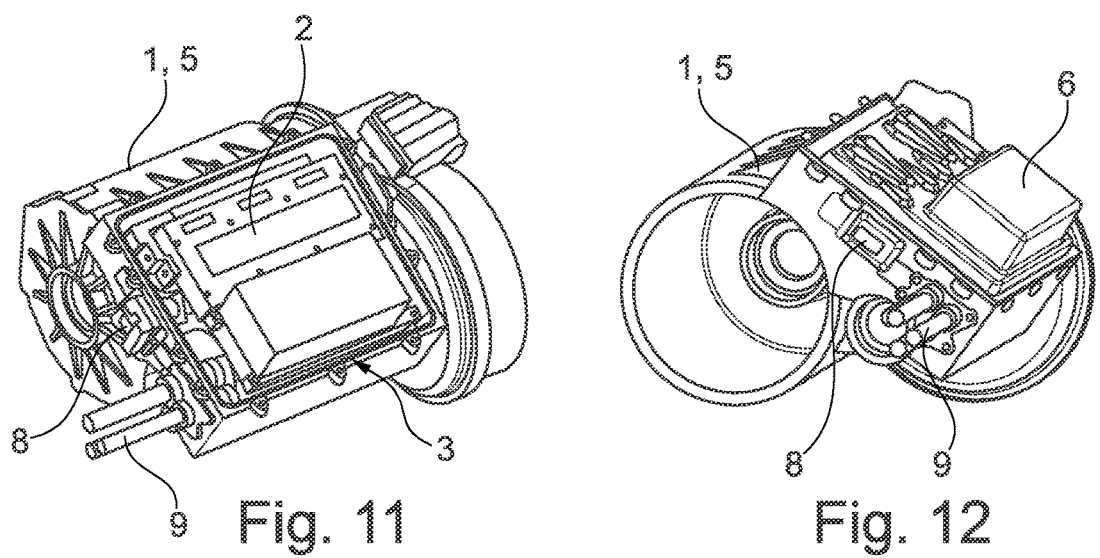
FIG. 11 illustrates a perspective view of the common housing having pre-assembled control components and electronic system components.
FIG. 12 illustrates a perspective view of the entirely assembled, common housing for the electronic system components and the control components having a cover.

The electronic system housing 1 is preferably produced from aluminum. The low voltage module/the low voltage component/the control module 3 is fastened via multiple screws 10 (cf. FIG. 6) on the electronic system housing 1. A rectangular recess 11 is provided in the electronic system housing 1 and in the assembled state a rectangular protrusion 12 of the low voltage component 3 engages into said recess, wherein the two components are sealed with respect to one another via a seal 13.

The FIGS. 7 to 12 illustrate a single-part design of the electronic system housing 1 with the overall housing 5. In the assembled state, the electronic system components such as the power electronic system 2 and the low voltage components 3 are therefore arranged in the lower part of the housing 1,5. In the second exemplary embodiment, the connector 7 for the signal plug 8 is integrated on the outer wall of the common housing 1, 5 on the housing 1, 5 for the electronic system components and the E-axle drive. There is also a connector for the current supply, the battery line 9. The lower part of the housing, therefore the original electronic system housing part 1, is sealed with respect to the environment via the cover 6.

LIST OF REFERENCE NUMERALS

1 Electronic system housing
2 Power electronic system
3 Low voltage component
4 Low voltage interface
5 Overall housing
6 Cover
7 Connector
8 Signal plug
9 Current connector/"battery line"
10 Screw
11 Recess
12 Protrusion
13 Seal

The invention claimed is:

1. An electronic system housing for an E-axle drive of a motor vehicle, comprising:
    a power electronic system disposed within the electronic system housing; and
    at least one low voltage component mounted directly on the electronic system housing, wherein the low voltage component is one of a motor sensor arrangement, a temperature sensor, a parking brake actuator system and a transmission actuator system,
    wherein the electronic system housing is arranged adjacent, and connected, to an overall housing, the overall housing being arranged to receive an electric machine,
    wherein an opening extends through a portion of the electronic system housing and the low voltage component includes a protrusion extending through the opening when mounted on the electronic system housing.

2. The electronic system housing as claimed in claim 1, wherein the low voltage component further comprises at least one interface for an actuator.

3. The electronic system housing as claimed in claim 1, wherein the electronic system housing and the overall housing include interfaces that engage with one another, wherein the interfaces are arranged to be pressed together in a positive-locking manner.

4. The electronic system housing as claimed in claim 1, wherein the electronic system housing is arranged below the overall housing.

5. The electronic system housing as claimed in claim 1, wherein at least one cooling connector is provided on the electronic system housing.

6. The electronic system housing as claimed in claim 1, wherein an intermediate element is arranged between the electronic system housing and the overall housing.

7. The electronic system housing of claim 1, wherein the power electronic system is configured to process voltage in a 48 volt voltage system.

8. The electronic system housing of claim 1, further comprising a seal disposed on an outer surface of the protrusion, wherein the seal is configured to seal the low voltage component to the electronic system housing.

\* \* \* \* \*